(12) United States Patent
Ueda et al.

(10) Patent No.: US 7,692,810 B2
(45) Date of Patent: Apr. 6, 2010

(54) IMAGE FORMING APPARATUS, INFORMATION PROCESSING APPARATUS, PROGRAM, RECORDING MEDIUM AND DATA TRANSMISSION METHOD

(75) Inventors: Suehiro Ueda, Nara (JP); Syoichiro Yoshirua, Nara (JP); Tsutomu Yoshimoto, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 1093 days.

(21) Appl. No.: 11/336,307

(22) Filed: Jan. 20, 2006

(65) Prior Publication Data
US 2006/0187495 A1 Aug. 24, 2006

(30) Foreign Application Priority Data
Feb. 18, 2005 (JP) ............................. 2005-041741

(51) Int. Cl.
G06F 15/00 (2006.01)
G06F 15/16 (2006.01)

(52) U.S. Cl. ..................................... 358/1.15; 709/206

(58) Field of Classification Search ................ 358/1.15, 358/1.13, 1.14, 1.16, 1.18, 1.8, 1.11, 1.9, 358/300, 296, 402, 404, 407; 348/207.11, 348/207.2, 14.08; 709/200, 201, 206, 217, 709/229; 710/2, 3, 8, 31, 68, 100, 53; 705/10, 705/14, 26; 379/100.08, 100.06, 265.09; 726/3, 26

See application file for complete search history.

(56) References Cited

U.S. PATENT DOCUMENTS

2006/0192990 A1*  8/2006  Tonegawa .................. 358/1.15

FOREIGN PATENT DOCUMENTS

| JP | 2001-306274 | 11/2001 |
| JP | 2002-189638 | 7/2002 |
| JP | 2003-298801 | 10/2003 |
| JP | 2003-333295 | 11/2003 |
| JP | 2004-289440 | 10/2004 |
| JP | 2005-011176 | 1/2005 |

* cited by examiner

Primary Examiner—Saeid Ebrahimi Dehkordy
(74) Attorney, Agent, or Firm—Edwards Angell Palmer & Dodge LLP; David G. Conlin; David A. Tucker

(57) ABSTRACT

When a user transmits data from a PC to the outside, log information can be accumulated in a composite machine connected via network to the PC and an unnecessary data outflow due to the data transmission can be prevented. In the PC, a transmission acceptance portion accepts from a user an operation for transmitting data to the outside of network and a data transfer portion transfers outside transmission data defined as a transmission target by the transmission acceptance portion to the composite machine via the network without transmitting directly to the outside. In the image forming apparatus (composite machine, etc.), a data reception portion receives the outside transmission data transmitted from the PC via the network, which are transmitted to the outside by a data transmission portion, and a log accumulation portion accumulates log information of the outside transmission data.

14 Claims, 7 Drawing Sheets

FIG.7

| USER | Email | FAX | FTP |
|---|---|---|---|
| A | ○ | ○ | ○ |
| B | × | ○ | × |
| C | × | × | × |
| ⋮ | ⋮ | ⋮ | ⋮ |

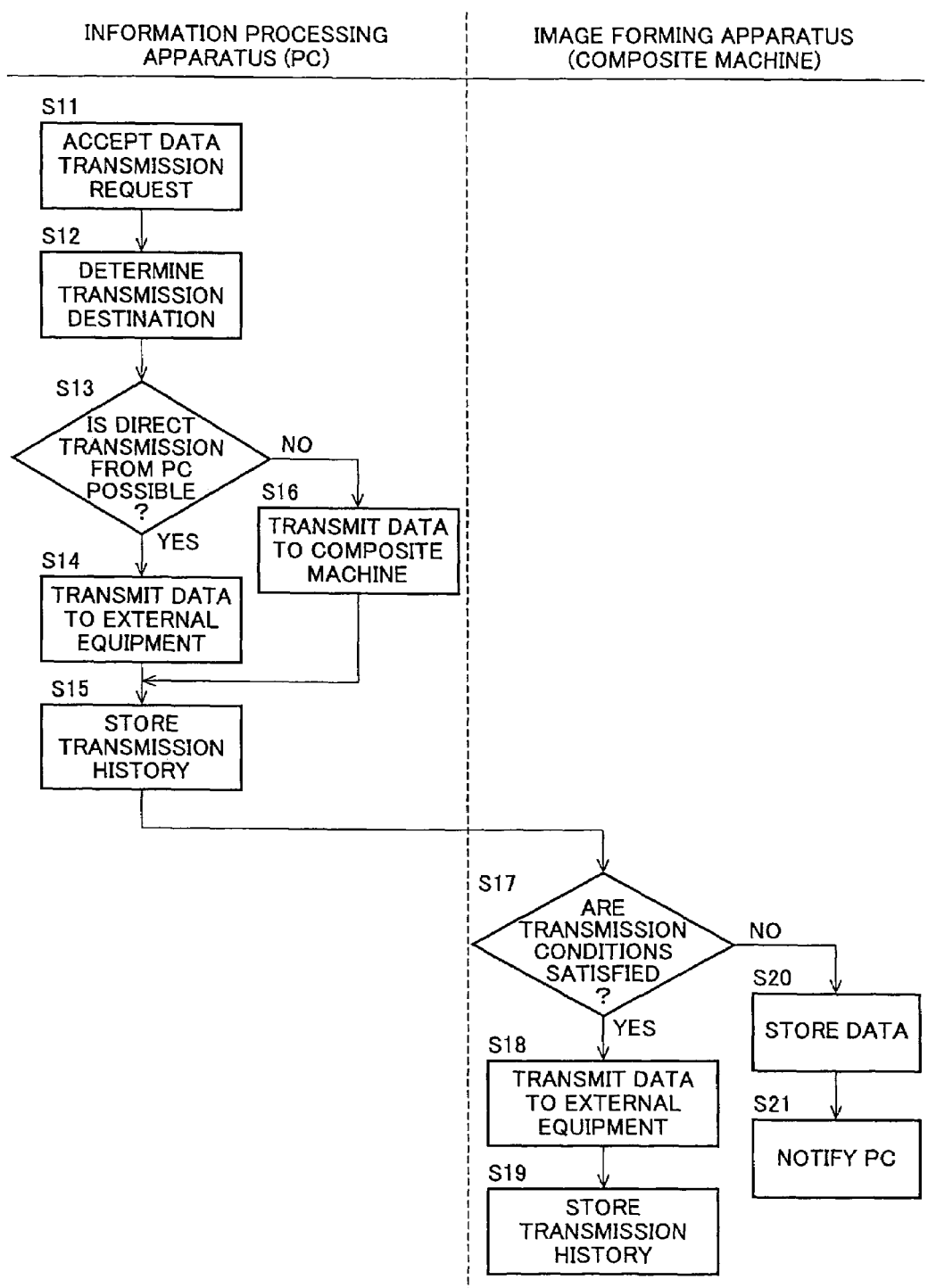

IMAGE FORMING APPARATUS, INFORMATION PROCESSING APPARATUS, PROGRAM, RECORDING MEDIUM AND DATA TRANSMISSION METHOD

CROSS-NOTING PARAGRAPH

This non-provisional application claims priority under 35 U.S.C. §119(a) on Patent Application No. 2005-041741 filed in JAPAN on Feb. 18, 2005, the entire contents of which are hereby incorporated herein by reference.

FIELD OF THE INVENTION

The present invention relates to an image forming apparatus, an information processing apparatus, a data transmission and data transfer program, a computer readable recording medium recording the program, and a data transmission method.

BACKGROUND OF THE INVENTION

Recently, as network becomes widespread, a personal computer (PC) can immediately transmit data to the outside. Recently, a composite machine combining a copy function, a facsimile function and a print function becomes diversified to be added with a function for sending transmitted print data, read image data or data accumulated in a hard disk to an external apparatus, and data transmission to the outside is easily enabled in the composite machine as well. As a function for transmitting to an external apparatus in the composite machine, functions such as "Scan to Email", "Scan to FAX" and "Scan to FTP (File Transfer Protocol)" are widely utilized. These functions can also be realized if a scanner is connected to a PC directly or via network.

As described above, since data can be easily transmitted from a PC or composite machine, in addition to management of data reception, an apparatus on the transmission side stores transmission histories such as transmission destinations, transmission dates and time and others associated with data transmission and manages data transmission.

However, in this day and age when a PC becomes diversified, since a plurality of PCs is often assigned to one (1) individual, it is difficult to manage transmission histories for data such as image data transmitted from an individual PC. As a reason, if data are transmitted from a PC, the transmission history is stored in the PC used by an individual and the transmission history can be easily deleted by the user.

Therefore, in order to centrally manage transmission and reception of data, a mail server, FTP server or the like is often used for transmitting and receiving data. This server is connected to a PC via network such as LAN, and all the data transmitted from the PC is sent to the server via the network and is transmitted to the outside via the server. In addition to reception histories accumulated in accordance with data reception, the server accumulates transmission histories as log information in accordance with data transmission.

Even if overall central management is performed by a server in this way, in terms of e-mail transmission, for example, it is problematic for security that important data are transmitted to the outside of a company, which should have been transmitted within the company, and a social problem has been presented by bad manners such as transmitting e-mails to superiors of outside companies as if transmitting e-mails to friends. Not exclusively to e-mails, transmission of data of one's own or others to the outside may happen as the case of blindly accessing to data even though an operation procedure is not known or as the case of an operation error generated carelessly by a user, as well as may be performed maliciously.

A transmission apparatus is proposed for limiting transmission depending on a size of data to be transmitted when the data are transmitted through a communication line (e.g., see Japanese Laid-Open Patent Publication No. 2003-333295). Along with transmission destination information indicating a transmission destination of data, the transmission apparatus described in Japanese Laid-Open Patent Publication No. 2003-333295 has a data table storing transmission-permitted size information indicating a data size permitted to be transmitted to the transmission destination and is configured to refer to the data table to determine whether transmission can be performed or not, when data are transmitted to a specified transmission destination, depending on the transmission-permitted size information of the transmission destination.

An image communication apparatus is proposed for reducing a load due to facsimile transfer of FAX data with a large size, or for preventing facsimile transfer of a wrong or unnecessary e-mail, or for appropriately notifying a sender or a transfer destination of a transfer result, when content of a received e-mail is transferred by facsimile (FAX) (e.g., see Japanese Laid-Open Patent Publication No. 2004-289440). In the image communication apparatus described in Japanese Laid-Open Patent Publication No. 2004-289440, a mail analysis portion analyzes a received mail received by a mail reception control portion to obtain a transmission destination address or transfer destination address and it is determined whether transfer is needed or not, by referring to a transfer list and an address book stored in auxiliary memory portion. If it is determined that the received mail is to be transferred, a communication control portion checks transfer conditions based on system data such as a transfer upper-limit size and a transfer time to conduct transfer cancellation, immediate transfer, divided transfer or timed transfer as well as transmits a transfer result to a source of the transfer instruction (in the case of an e-mail sender, a report is returned by an e-mail from a mail transmission/reception control portion, or in the case of a transfer list, a transfer result is transmitted by FAX from the communication control portion).

As described above, for e-mail transmission of a mail server, file transmission of an FTP server, facsimile transmission of a FAX machine and the like, even if overall central management is performed by a server, security problems are generated by the case such that data prohibited to be transmitted are transmitted by wrong transmission or maliciously. In the apparatuses described in Japanese Laid-Open Patent Publication No. 2003-333295 and Japanese Laid-Open Patent Publication No. 2004-289440, transmission to the outside can only be limited in data capacity and similar problems may be generated.

Since log information accumulated in the server is an enormous amount and the log cannot be accessed for retrieval and, of course, cannot be browsed unless authorized as an administrator of the server, a general user is almost impossible to retrieve and browse past transmission histories. By transmitting data from a PC to the outside via a server, although a transmission record is left as log information in the PC in addition to log information accumulated in the server, since this log information is, of course, under the supervision of an individual in a current usage environment, retrieval and browse of transmission histories in the PCs of others are almost impossible because a multiplicity of individual PCs exists as well as because of password protection and the like. Therefore, in the current usage environment, comprehensive log management is impossible for data transmission to the outside, and this is the same even if applying the apparatuses described in Japanese Laid-Open Patent Publication No. 2003-333295 and Japanese Laid-Open Patent Publication No. 2004-289440.

SUMMARY OF THE INVENTION

An object of the present invention is to provide an image forming apparatus, an information processing apparatus, a data transmission and data transfer program, a computer readable recording medium recording the program, and a data transmission method which can accumulate log information when a user transmits data from an information processing apparatus to the outside.

Another object of the present invention is to provide an image forming apparatus, an information processing apparatus, a data transmission and data transfer program, a computer readable recording medium recording the program, and a data transmission method which can accumulate log information and which can prevent an unnecessary data outflow due to data transmission when a user transmits data from an information processing apparatus to the outside.

A further object of the present invention is to provide an image forming apparatus connectable to an information processing apparatus via a network, comprising a data reception portion receiving outside transmission data transmitted from the information processing apparatus via the network; a data transmission portion transmitting the outside transmission data received by the data reception portion to the outside; and a log accumulation portion accumulating log information of the outside transmission data transmitted to the outside by the data transmission portion.

A further object of the present invention is to provide an image forming apparatus wherein the log accumulation portion accumulates the log information in a manner enabling to be browsed from the information processing apparatus via the network.

A further object of the present invention is to provide an image forming apparatus further comprising a transmission restraint portion permitting only the outside transmission data received by the data reception portion satisfying predetermined conditions to be transmitted by the data transmission portion.

A further object of the present invention is to provide an image forming apparatus wherein the predetermined conditions include conditions about a transmission destination and/or transmission date and time of the outside transmission data.

A further object of the present invention is to provide an image forming apparatus wherein the predetermined conditions are set for each user of the information processing apparatus.

A further object of the present invention is to provide an image forming apparatus wherein the predetermined conditions include conditions about a user of the information processing apparatus.

A further object of the present invention is to provide an image forming apparatus wherein the transmission restraint portion includes a data transfer portion transferring the outside transmission data for the purpose of obtaining permission to the information processing apparatus used by another user associated with a user of the information processing apparatus which is a transmission source of the outside transmission data when data transmission to the outside is restrained.

A further object of the present invention is to provide an image forming apparatus wherein the data reception portion includes an outside reception portion receiving outside transmission data in a plurality of transmission modes and wherein the data transmission portion includes an outside transmission portion supporting the plurality of the transmission modes.

A further object of the present invention is to provide an image forming apparatus wherein the outside transmission portion includes at least one of an e-mail transmission portion, a facsimile transmission portion and an FTP-based file transfer portion.

A further object of the present invention is to provide an image forming apparatus wherein the information processing apparatus is another image forming apparatus different from the image forming apparatus.

A further object of the present invention is to provide an information processing apparatus connectable to an image forming apparatus via a network, comprising a transmission acceptance portion accepting from a user an operation of transmitting data to the outside of the network; and a data transfer portion transferring outside transmission data defined as a transmission target by the transmission acceptance portion to the image forming apparatus via the network without transmitting directly to the outside.

A further object of the present invention is to provide an information processing apparatus further comprising a transfer determination portion determining whether or not outside transmission data defined as a transmission target by the transmission acceptance portion is needed to be transferred to the image forming apparatus by the data transfer portion; and a data transmission portion transmitting outside transmission data defined as a transmission target by the transmission acceptance portion directly to the outside, only in case the transfer determination portion determines that the transfer to the image forming apparatus is not needed.

A further object of the present invention is to provide an information processing apparatus wherein the information processing apparatus is another image forming apparatus different from the image forming apparatus.

A further object of the present invention is to provide a program incorporated into an image forming apparatus connectable to an information processing apparatus via a network, the program operable to drive a central processing unit of the image forming apparatus to execute a data reception step of receiving outside transmission data transmitted from the information processing apparatus via a network; a data transmission step of transmitting the outside transmission data received in the data reception step to the outside; and a log accumulation step of accumulating log information of the outside transmission data transmitted to the outside in the data transmission step into a storage within the image forming apparatus.

A further object of the present invention is to provide a program wherein the log accumulation step is a step of accumulating the log information in a manner enabling to be browsed from an information processing apparatus via a network.

A further object of the present invention is to provide a program wherein the program includes a program operable to drive the central processing unit to execute a transmission restraint step of permitting only the outside transmission data received in the data reception step satisfying predetermined conditions to be transmitted in the data transmission step.

A further object of the present invention is to provide a program incorporated into an information processing apparatus connectable to an image forming apparatus via a network, the program operable to drive a central processing unit of the information processing apparatus to execute a data transmission acceptance step of accepting from a user an operation of transmitting data to the outside of the network; and a data transfer step of transferring outside transmission data defined as a transmission target in the data transmission acceptance step to the image forming apparatus via the network without transmitting directly to the outside.

A further object of the present invention is to provide a program wherein the program includes a program operable to drive the central processing unit to execute a transfer determination step of determining whether or not outside transmission data defined as a transmission target in the data transmission acceptance step is needed to be transferred to the image forming apparatus in the data transfer step; and a data transmission step for transmitting outside transmission data defined as a transmission target in the data transmission acceptance step directly to the outside, only in case the transfer determination step determines that the transfer to the image forming apparatus is not needed.

A further object of the present invention is to provide a computer readable recording medium having the program recorded thereon.

A further object of the present invention is to provide a data transmission method for transmitting data in a system connecting an image forming apparatus to an information processing apparatus via a network, comprising a data transmission acceptance step of the information processing apparatus accepting from a user an operation of transmitting data to the outside of the network; a data transfer step of the information processing apparatus transferring outside transmission data defined as a transmission target in the data transmission acceptance step to the image forming apparatus via the network without transmitting directly to the outside; a data reception step of the image forming apparatus receiving outside transmission data transferred from the information processing apparatus via the network; a data transmission step of the image forming apparatus transmitting the outside transmission data received in the data reception step to the outside; and a log accumulation step of the image forming apparatus accumulating log information of the outside transmission data transmitted to the outside in the data transmission step.

A further object of the present invention is to provide a data transmission method further comprising a transmission restraint step of the image forming apparatus permitting only the outside transmission data received in the data reception step satisfying predetermined conditions to be transmitted in the data transmission step.

BRIEF DESCRIPTION OF THE DRAWINGS

FIG. 7 is a diagram for describing an example of transmission conditions in the processing of FIG. 4; and FIG. 8 is a flowchart for describing another example of outside data transmission processing in the system shown in FIG. 2 and FIG. 3.

PREFERRED EMBODIMENTS OF THE INVENTION

Figure 1:
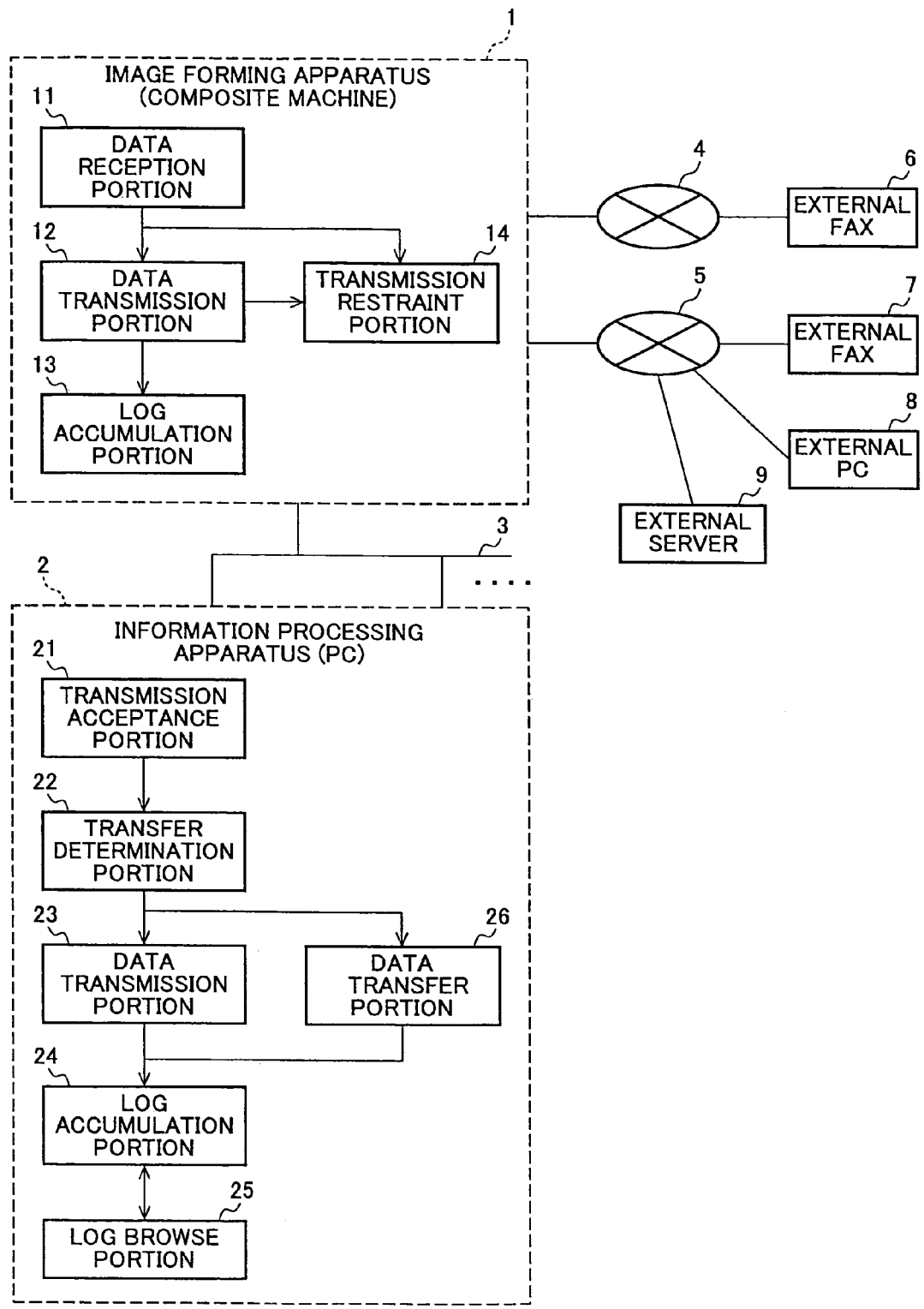
FIG. 1 shows a configuration example of a system composed of an image forming apparatus and an information processing apparatus according to one embodiment of the present invention.

FIG. 1 is a diagram showing a configuration example of a system composed of an image forming apparatus and an information processing apparatus according to one embodiment of the present invention, and in this FIG.: 1 is an image forming apparatus; 2 is an information processing apparatus; 3 is local area network (LAN); 4 is telephone line network; 5 is the internet; 11 is a data reception portion; 12 is a data transmission portion; 13 is a log accumulation portion; 14 is a transmission restraint portion; 21 is a transmission acceptance portion; 22 is a transfer determination portion; 23 is a data transmission portion; 24 is a log accumulation portion; 25 is a log browse portion; and 26 is a data transfer portion.

Although the image forming apparatus according to the present invention corresponds to, for example, an analog/digital composite machine having a copy function, facsimile function, print function, scanner function, file transmission function (including transmission and reception of e-mails), filing function and the like, of course, other functions may be provided or all of these functions may not be provided, and an apparatus can be applied if the apparatus is provided with at least one function for image forming and one function for data transmission and can be connected to an information processing apparatus such as a PC via network. On the other hand, as the information processing apparatus according to the present invention, an apparatus can be applied if the apparatus can be connected to an image forming apparatus via network and is provided with at least one function for data transmission. As the information processing apparatus according to the present invention, an information forming apparatus can be applied which is represented by an analog/digital composite machine having a copy function, facsimile function, print function, scanner function, file transmission function, filing function and the like as described above, and especially, an image forming apparatus provided with an e-mail or FTP function can be preferably applied.

The image forming apparatus 1 according to the present invention is comprised of the data transmission portion 12 as a means for executing one function for data transmission and is also comprised of the data reception portion 11 and the log accumulation portion 13. The data reception portion 11 has a means for receiving outside transmission data transmitted from the information processing apparatus 2 via the network 3. The data transmission portion 12 transmits the outside transmission data received by the data reception portion 11 to the outside.

For example, the data transmission portion 12 corresponds to a portion for transmitting data to an external FAX 6 via the telephone line network 4 and a portion for transmitting data to an external internet FAX 7, external PC 8, external server 9 and the like (an e-mail transmission portion and a file transfer portion based on the FTP) via the internet 5. In this way, the data reception portion 11 preferably has an outside reception portion for receiving outside transmission data in a plurality of transmission modes and, accordingly, the data transmission portion 12 preferably has an outside transmission portion (a portion for transmitting outside transmission data to the outside) supporting the plurality of transmission modes.

The log accumulation portion 13 accumulates log information of the outside transmission data transmitted by the data transmission portion 12 to the outside. The log information is preferably accumulated in a manner enabling to be browsed by screen display or printing with the log browse portion 25 composed of a browser or a print instruction portion, for example.

The image forming apparatus 1 is preferable comprised of the transmission restraint portion 14. The transmission restraint portion 14 has a means for giving permission of transmission by the data transmission portion 12 only to the outside transmission data received by the data reception portion 11 which satisfy predetermined conditions. The predetermined conditions are described later with reference to specific examples.

On the other hand, the information processing apparatus 2 such as a PC acting as a transmission source of the outside transmission data needs only to be comprised of a general transmission portion as a means for executing one function for data transmission and the transmission acceptance portion 21 for accepting the data transmission from a user. The transmission acceptance portion 21 has a means for accepting an operation from a user transmitting data to the outside of the network 3. As described above, the operation accepted here can preferably support a plurality of transmission modes.

The information processing apparatus 2 is comprised of the data transfer portion 26 as the transmission portion described above. The data transfer portion 26 has a means for transferring the outside transmission data defined as a transmission target by the transmission acceptance portion 21 to the image forming apparatus 1 via network 3, rather than directly transmitting to the outside. In order to limit transmission in the transmission restraint portion 14, the data transfer portion 26 may be configured to transmit information about a user (e.g., authentication information) to the image forming apparatus 1 as well.

Although all the transmission data may be requested to be transmitted by the data transfer portion 26 to the outside via the image forming apparatus 1, transmission direct to the outside may be enabled for the data which may be transmitted directly to the outside in accordance with determination on the information processing apparatus 2 side. Therefore, preferably, the information processing apparatus 2 is comprised of the transfer determination portion 22 and the data transmission portion 23. The transfer determination portion 22 has a means for determining whether the outside transmission data defined as a transmission target by the transmission acceptance portion 21 are needed to be transferred by the data transfer portion 26 to the image forming apparatus 1. The data transmission portion 23 is one of the transmission portions described above and is a portion provided in a general information processing apparatus. However, the data transmission portion 23 transmits the outside transmission data defined as a transmission target by the transmission acceptance portion 21 directly to the outside only when it is determined by the transfer determination portion 22 that the data are not needed to be transferred to the image forming apparatus 1. In other words, the data transmission portion 23 receives a data transmission request only from the transfer determination portion 22 rather than the transmission acceptance portion 21.

As described above, by the system connecting the image forming apparatus 1 to the information processing apparatus 2 via the network 3, data are transmitted to the outside as follows, for example. First, the information processing apparatus 2 accepts from a user an operation for transmitting data to the outside of the network 3, and the information processing apparatus 2 transfers the outside transmission data defined as a transmission target to the image forming apparatus 1 via the network 3 rather than directly transmitting the data to the outside. The image forming apparatus 1 receives the outside transmission data transferred from the information processing apparatus 2 via the network 3 and transmits the received outside transmission data to the outside. The image forming apparatus 1 accumulates log information of the outside transmission data transmitted to the outside, in a manner enabling to be browsed from the information processing apparatus 2 with the log browse portion 25. This is enabled by utilizing the fact that the image forming apparatus 1 of a digital composite machine and the like has a data transmission/reception function and can leave a log, and all the logs are enabled to be managed by the intervention of the image forming apparatus 1. Differing from a typical mails server or FTP server, the image forming apparatus 1 preferably enables a general user to browse (and print) the log. Of course, even though the logs (transmission histories) accumulated here can be browsed, since a general user cannot manage the logs, data transmission to the outside of the company can be comprehended by an administrator of the composite machine managing the logs.

In such a system, limitation of data transmission to the outside is performed by the transfer determination portion 22 of the information processing apparatus 2 and/or the transmission restraint portion 14 of the image forming apparatus 1. Therefore, with regard to the external transmission to the outside of the company and the like, security can be planned to be improved for the outflow of data by inhibiting transmission from the PC and transmitting the data from the composite machine to perform uniform management of the history of transmission to the outside of the company. For example, even if it is attempted to transmit data from a PC to the outside of the company, by determining transmission destination information of the e-mail or the like to transmit the image data to be transmitted to the composite machine once via network for e-mail transmission from the composite machine, uniform management can be performed for the transmission history of the transmission of the image data such as a sender and a transmission destination, or by providing transmission restraint in the composite machine, transmission restraint can be performed for all the users only by setting the composite machine, and therefore, security can be planned to be improved because careless outflow of important data to the outside of the company can be prevented. When transmitting data, by controlling whether the information are transmitted from a PC or composite machine depending on a transmission destination, the storage location can be selected for the transmission history at the time of the transmission as a result.

Figure 2:
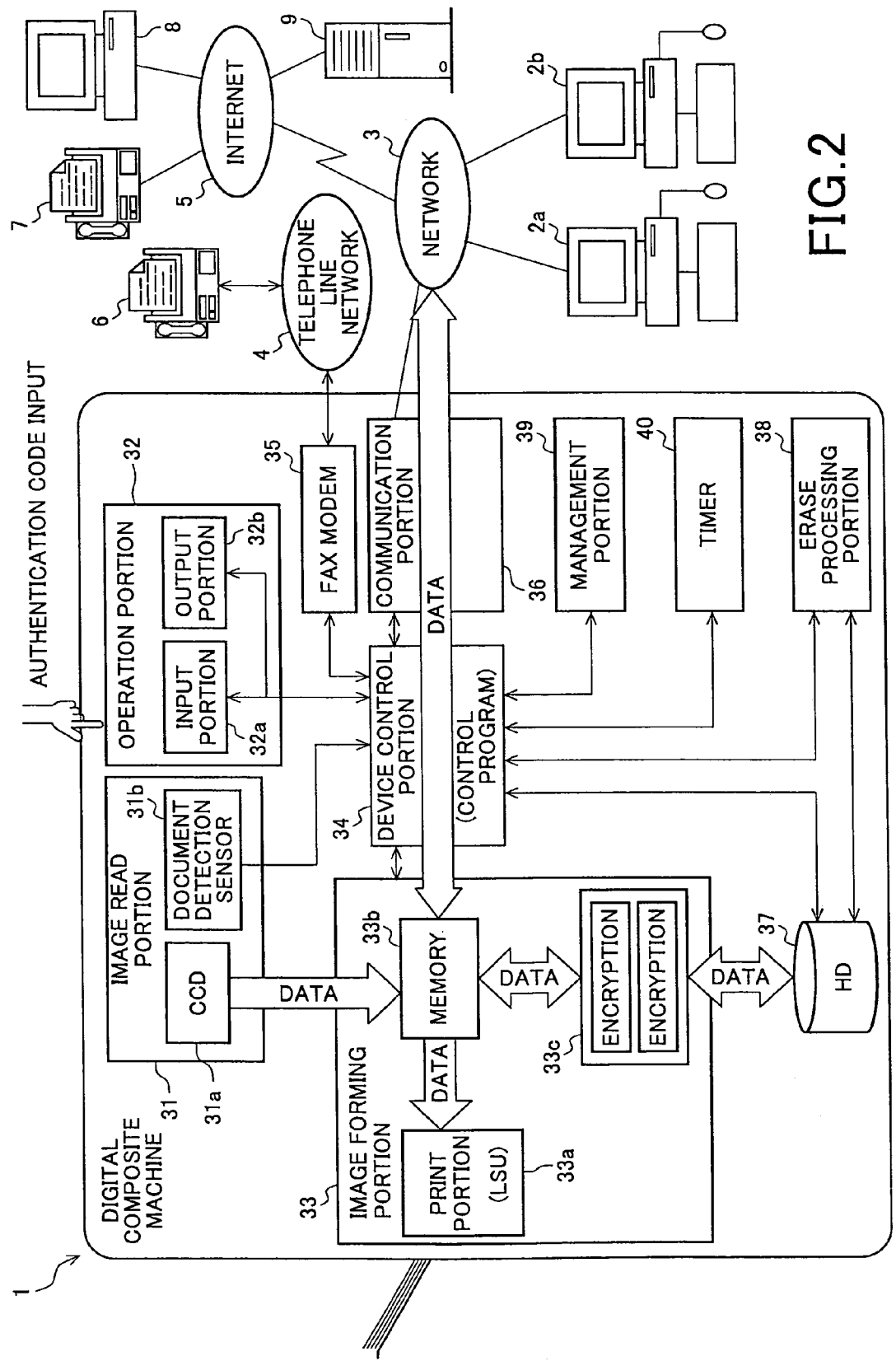
FIG. 2 shows a configuration example of the system of FIG. 1.

FIG. 2 is a diagram showing one configuration example of the system of FIG. 1; 1 is a digital composite machine as an example of the image forming apparatus; 3 is network (such as LAN); 4 is telephone line network; 5 is the internet network; 6 is an external FAX; 7 is an internet FAX; 8 is an external PC; 9 is an external server; 2a and 2b are terminal PCs as an example of the information processing apparatus; 31 is an image read portion; 32 is an operation portion; 33 is an image forming portion; 34 is a device control portion; 35 is a FAX modem; 36 is a communication portion; 37 is a hard disk (HD); 38 is an erase processing portion; 39 is a management portion; and 40 is a timer.

The digital composite machine 1 illustrated in FIG. 2 is connected to, for example, the external FAX 6 through the telephone line network 4 and is also connected to a plurality of the terminal PCs 2a, 2b . . . through the network 3 such as LAN (Local Area Network) and WAN (Wide Area Network) as well as to the internet FAX 7, the external PC 8, the external server 9 and others located outside the network 3 via the internet network 5. Various data can be transmitted and received through these network configurations.

The digital composite machine 1 is constituted by the image read portion 31, the operation portion 32, the image forming portion 33, the device control portion 34, the FAX modem 35, the communication portion 36, the HD 37, the erase processing portion 38, the management portion 39, the timer 40 and others. For the digital composite machine 1 according to the present invention, the form of the configuration and the connection with external devices is not limited to the form of this example and needs only to be comprised of each portion described above. Each portion does not necessarily have to be configured by hardware and can be easily implemented by incorporating a program allowing the digital composite machine 1 to act as a means included in those portions into a control portion such as the device control portion 34 (or by partially incorporating a log management program, a transmission restraint program or the like into the management portion 39) to allow a calculation apparatus to execute the program. The program described above is often implemented as firmware in the device control portion 34 or the management portion 39 of the digital composite machine 1.

This program is a program incorporated into the digital composite machine 1 which can be connected to the PC 2a and the like via the network 3 and allowed to be executed by a central processing unit in the digital composite machine 1. This program forces the central processing unit to execute the steps such as receiving outside transmission data transmitted from the PC 2a and the like via the network 3, transmitting the received outside transmission data to the outside and accumulating log information of the outside transmission data transmitted to the outside (in a manner enabling to be browsed from the PC 2a and the like). These steps preferably include a transmission restraint step for permitting only the received outside transmission data satisfying predetermined conditions to be transmitted.

The operation portion 32 is composed of a touch panel and the like comprising an output portion (display portion) 32b for displaying an operation screen and an input portion 32a for allowing a user to input various types of setting and operation details based on the display. Based on the operation on the operation portion 32, the image read portion 31 detects whether a document exists or not with a document detection sensor 31b, reads the document with a CCD (charge-coupled device) 31a and outputs the document as read image data. The FAX modem 35 is a modem for performing facsimile communication with the external FAX 6. The communication portion 36 controls communication of the digital composite machine 1 with the external equipment connected via the network 3.

The image forming portion 33 temporarily stores into a memory 33b the image data read by the image read portion 31 and the received data received by the FAX modem 35 or communication portion 36 and forms an image on a medium such as a paper sheet through a print portion 33a equipped with a laser scanner unit (LSU). The image forming portion 33 can encrypt data such as the image data stored in the memory 33b with an encryption processing portion 33c and store the data into the HD 37 and can decrypt the encrypted data stored in the HD 37 reversely to output to the external equipment via the memory 33b through the network 3 and the like or to print and output as a medium with the print portion 33a. The erase processing portion 38 performs processing for erasing data stored in the HD 37 in order to maintain security or ensure storage capacity.

The device control portion 34 is a main control portion connected to each portion described above and generally controls the operation of the digital composite machine 1 such as exchange of data between the portions of the digital composite machine 1 while referring to the management data of the management portion 39 and the timer time from the timer 40. The management portion 39 manages, for example, the above-described log information stored in the HD 37, a table of transmission restraint information described in FIG. 5 to FIG. 7 later and the IP address of the own machine 1. The timer 40 counts time of the waiting state of the digital composite machine 1 to notify the device control portion 34 of the time. As an example of the control in the device control portion 34, the operation portion 32 notifies the device control portion 34 of copy requirements, various recording conditions and the like instructed from the operational input of the user, and the device control portion 34 displays the operation state of the digital composite machine 1 on the display screen of the display portion 32b of the operation portion 32 and instructs the image forming portion 33 to perform print processing and the like. Then, the device control portion 34 controls the transmission restraint and the log management for the outside transmission data transmitted from the PC 2a and the like with the management portion 39 by referring to the transmission restraint information in the HD 37 and the like.

As described above, the digital composite machine 1 is provided with the key input portion 32a and the display portion 32b in the operation portion 32, and ID input can be performed in addition to the functional instruction operation of the digital composite machine 1. In addition to the ID input, the digital composite machine 1 may be equipped with an ID card reader for inputting an ID card and reading the information thereof. In this way, the digital composite machine 1 is preferably comprised of some sort of a user identification portion, for example, such an authentication portion. The authentication portion needs only to authenticate a user based on user information to enable usage of the own machine 1, and the digital composite machine 1 limits the user with this authentication portion first. The digital composite machine 1 can perform bidirectional data communication with the connected equipment (terminal PC 2a, 2b and the like) by using the communication portion 36.

Figure 3:
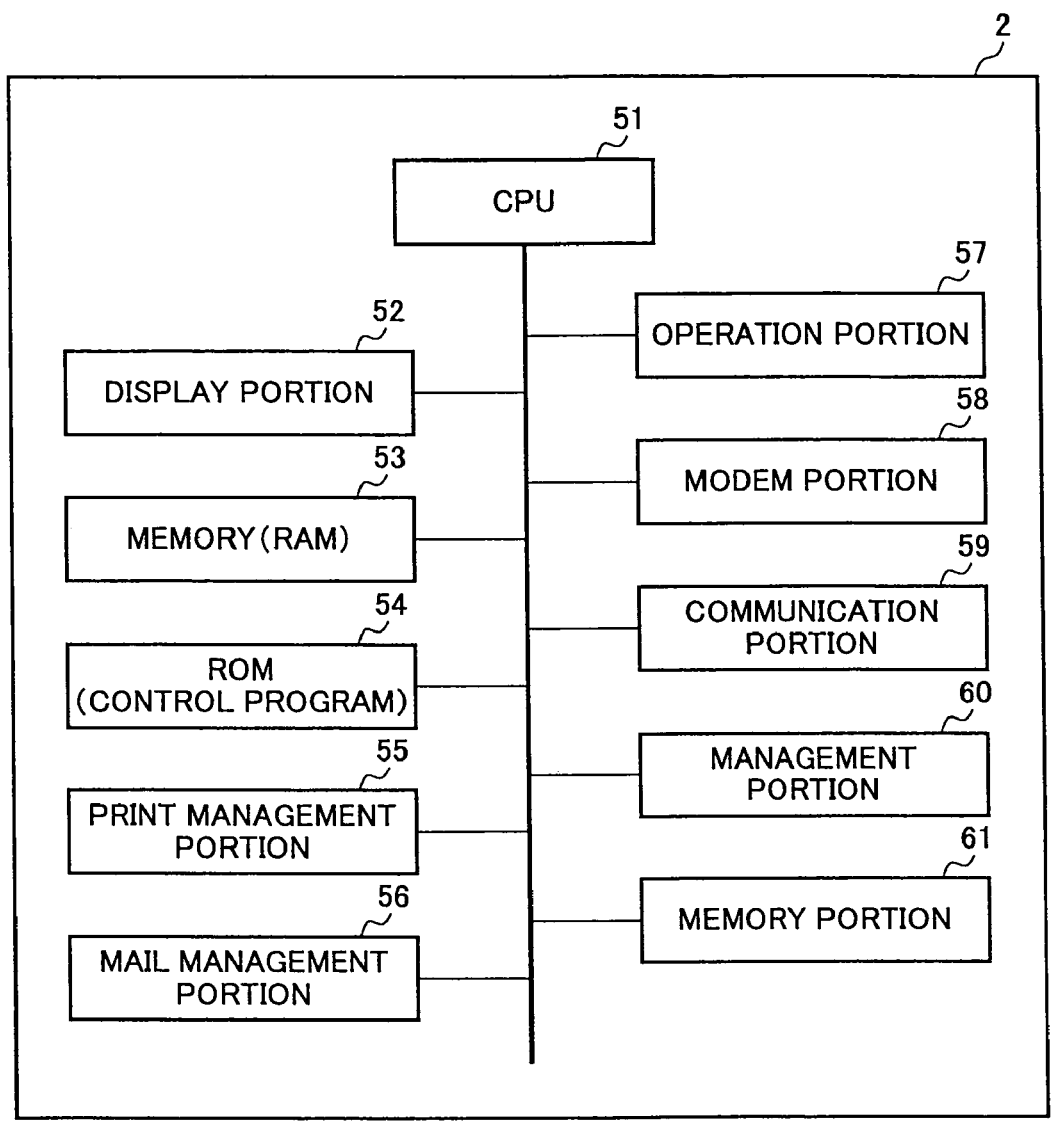
FIG. 3 shows a configuration example of a PC of FIG. 2.

FIG. 3 is a diagram showing a configuration example of the PC of FIG. 2, and in this FIG.: 2 is a PC; 51 is a CPU (Central Processing Unit); 52 is a display portion; 53 is a memory such as a RAM (Random Access Memory); 54 is a ROM (Read Only Memory) storing an operation system and other control programs; 55 is a print management portion; 56 is a mail management portion; 57 is an operation portion; 58 is a modem portion; 59 is a communication portion; 60 is a management portion; and 61 is a memory portion.

In the PC 2 illustrated in FIG. 3, the main components thereof are: the operation portion 57 such as a keyboard, a mouse and others for inputting various pieces of information; the memory portion 61 such as a hard disk and an external recording medium read apparatus; the communication portion 59 composed of a network equipment and others for input from other equipments; the modem portion 58 composed of a modem and others for performing facsimile communication via a telephone line; the display portion 52 which is a display such as a CRT or LCD for displaying notification information and other types of information; the print management portion 55 composed of a printer driver and a connector for controlling printing in a print apparatus connected to the PC 2; the mail management portion 56 composed of a mailer for transmitting and receiving an e-mail via the communication portion 59 and the modem portion 58; the management portion 60 composed of a program for performing the log management and the transfer processing; a hard disk and the ROM (which may be a rewritable ROM) 54 recording a control program; the CPU 51 for executing the control program and programs of each portion stored in the hard disk and the ROM 54; and the memory 53 as an execution area of the programs, which are illustrated as connected to a bus.

These programs loaded in the PC 2 are programs to be executed by the CPU 51 and allow the CPU 51 to execute the steps such as accepting from a user the operation for transmitting data to the outside of the network 3 and transferring the outside transmission data to be transmitted to the digital composite machine 1 via the network 3 rather than transmitting the data directly to the outside. Other application examples are as described above and descriptions thereof are omitted. These programs may be provided with a graphical user interface (GUI) for the display portion 52 in order to facilitate the usage by the apparatus user. The information handled by these apparatuses is temporarily accumulated in the memory 53 at the time of processing and then stored into various types of the ROM 54 or the hard disk to be read, modified or written by the CPU 51 if needed. The transfer program according to the present invention on the PC 2 side is preferable executed as resident software in the background such that the user of the PC 2 does not know that the program is activated and, preferably, the execution of this resident software cannot be made disabled.

Figure 4:
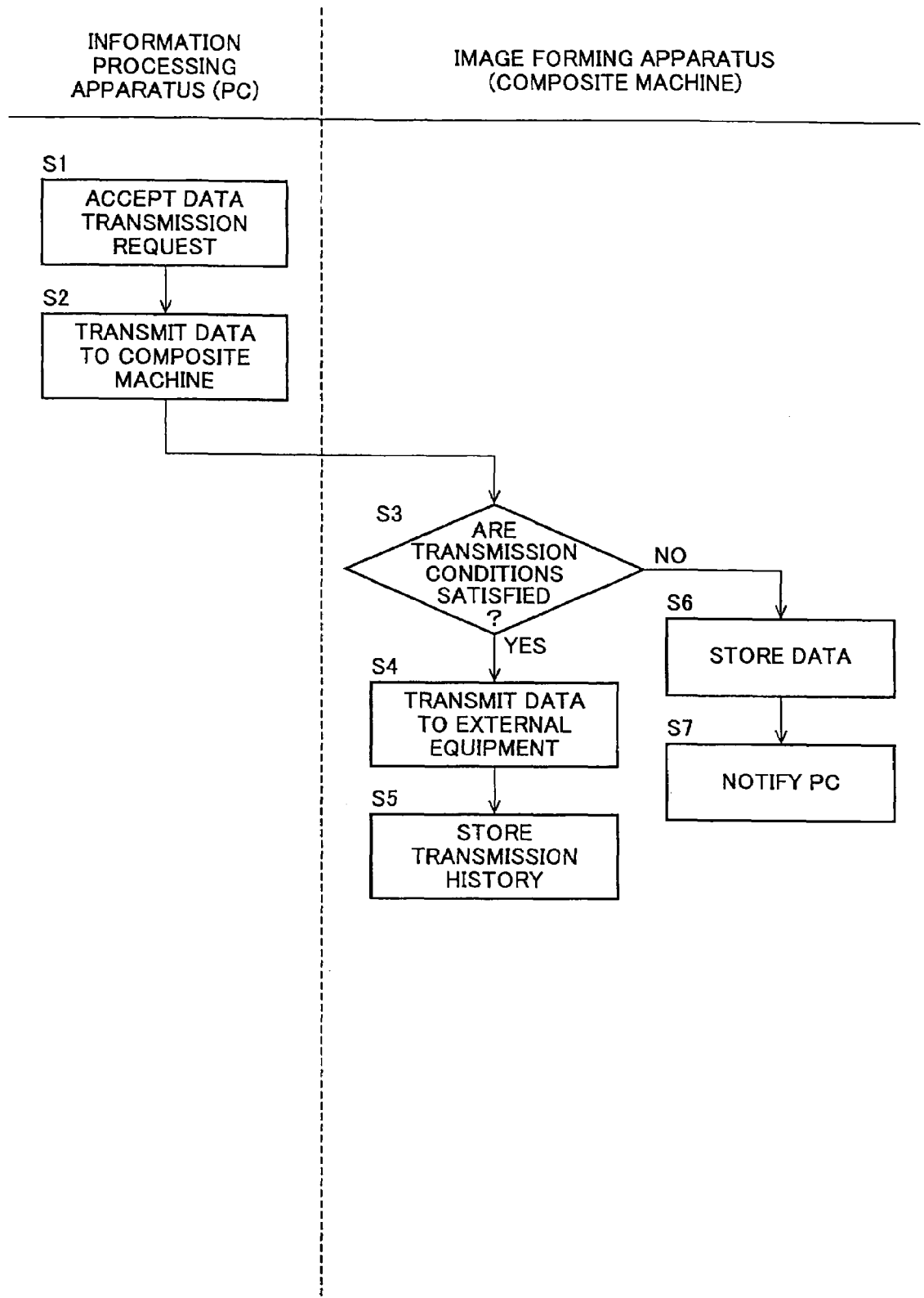
FIG. 4 is a flowchart for describing an example of outside data transmission processing in the system shown in FIG. 2 and FIG. 3.
Figure 5:
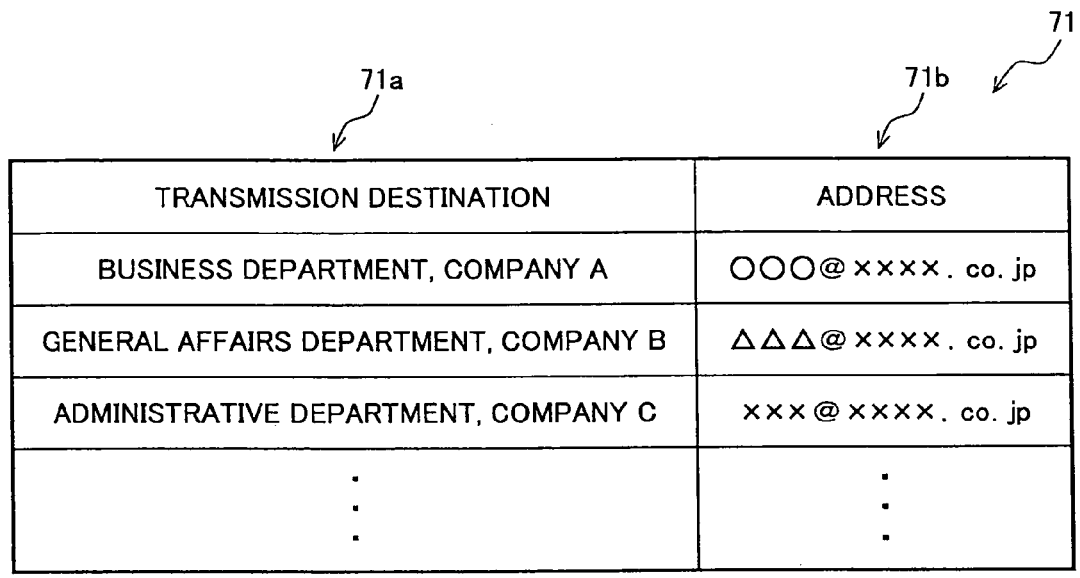
FIG. 5 is a diagram for describing an example of transmission conditions in the processing of FIG. 4.
Figure 6:
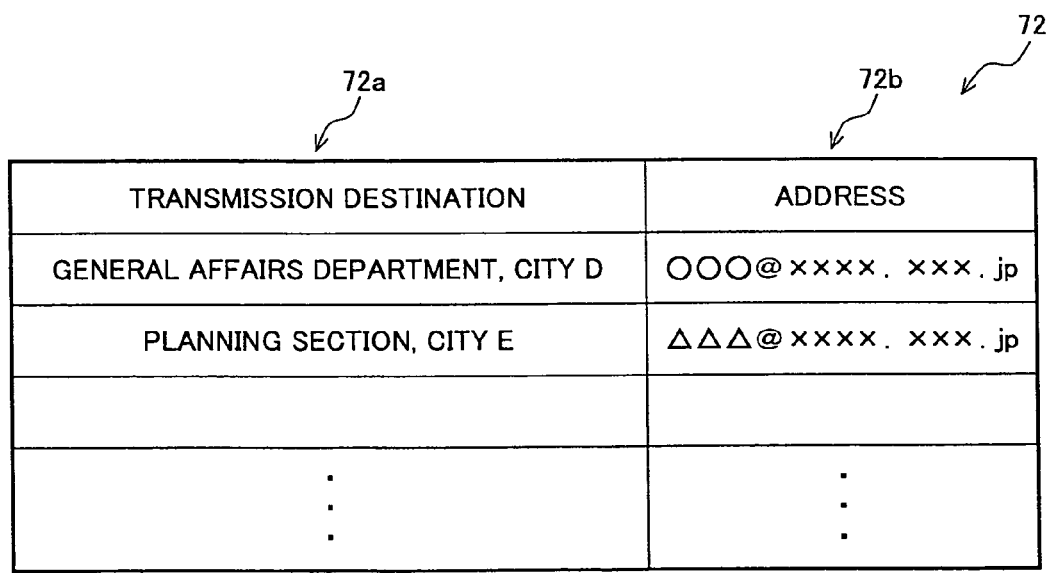
FIG. 6 is a diagram for describing an example of transmission conditions in the processing of FIG. 4.
Figure 7:
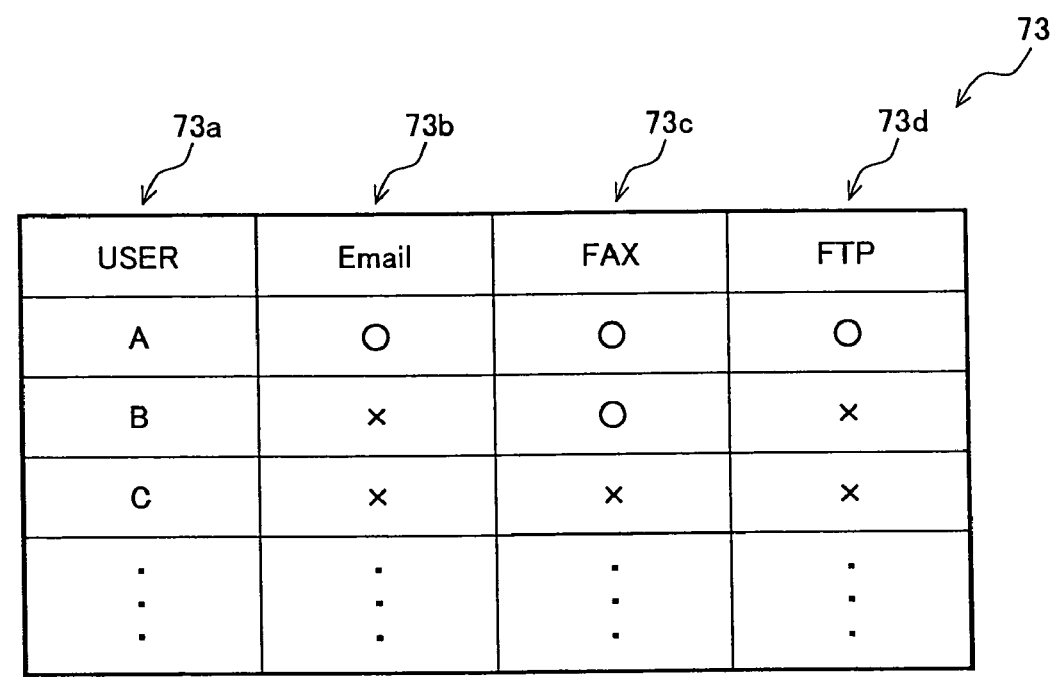

FIG. 4 is a flowchart for describing an example of the outside data transmission processing in the system shown in FIG. 2 and FIG. 3. Each of FIG. 5 to FIG. 7 is a diagram for describing an example of transmission conditions in the processing of FIG. 4.

As described above, by the system connecting the digital composite machine 1 to the PC 2 via the network 3, data are transmitted to the outside as follows, for example. First, the operation portion 57 of the PC 2 accepts from a user the operation for transmitting the data to the outside of the network 3 (step S1) and the outside transmission data defined as a transmission target are transferred to the digital composite machine 1 via the network 3 rather than transmitting directly to the outside (step S2). At this point, for example, if the transmission mode of the data is an e-mail, the mail management portion 56 is controlled such that the CPU 51 transfers the operation received by the operation portion 57 to the digital composite machine 1 based on the program. For example, by following a processing procedure such that the data are transmitted by the mail management portion 56 to the digital composite machine 1 and then transmitted from the digital composite machine 1 to the specified destination, not only the log is left in the individual PC 2, but also the management log is left on the digital composite machine 1 side. Similarly, the communication portion 59 is controlled by the CPU 51 in the case of file transmission and the modem portion 58 is controlled in the case of FAX transmission.

The digital composite machine 1 receives the outside transmission data transferred from the PC 2 via the network 3 with the communication portion 36 and transmits the received outside transmission data to the outside with the communication portion 36 or FAX modem 35 as well. The digital composite machine 1 accumulates the log information of the outside transmission data transmitted to the outside into the HD 37 in a manner enabling the log management with the management portion 39.

In such a system, the limitation of the transmission of the data to the outside is performed by executing a transmission restraint program in the device control portion 34 and the like.

In other words, the digital composite machine 1 determines whether the received outside transmission data satisfy transmission conditions or not (step S3), and if the transmission conditions are satisfied, the data are transmitted to the specified external equipment (step S4) and the transmission history (transmission log) is stored (step S5). On the other hand, if the transmission conditions are not satisfied, the data are stored (step S6), and the sending PC 2 (or a PC used by a supervisor of the user of the PC 2) is notified of this (step S7).

If only the log is stored in the digital composite machine 1, inconvenience may be caused to the outside of the company and the like, however, by performing the transmission restraint for important business partners and the like and by enabling e-mail transmission if permission can be obtained from the administrator of the digital composite machine 1 or the supervisor in this way, annoying e-mails can be prevented from being transmitted to the outside of the company. As a simple example, verification may be performed for a user not registered in the digital composite machine 1 and transmission to the outside may be permitted for a registered user.

With regard to step S7, the transmission restraint portion 14 of FIG. 1 is preferably comprised of the next data transfer portion. When the data transmission to the outside is restrained, this data transfer portion transfers outside transmission data of a PC used by another user (in general, another PC) associated with the user of the transmission source PC 2 of the outside transmission data, for the purpose of obtaining permission.

In this way, in the present embodiment, the PC 2 and the digital composite machine 1 are connected through the network 3 and each apparatus is provided with a plurality of transmission functions for transmitting information to the outside and can identify (limit) the transmission path depending on the transmission destinations. In this way, not only e-mails can be easily transmitted to the inside and outside of the company in accordance with the development of network, but also security problems can be solved which occur in the case such that important data intended to be transmitted by an e-mail within the company are transmitted to the outside of the company by specifying a wrong transmission destination, as well as, in the case such that an e-mail is transmitted to a superior of an outside company as if transmitting e-mails to a friend, transmission of data in a bad manner can be restrained by enabling all the users to browse the logs. By enabling all the users to browse the logs, job histories such as who accesses who can be comprehended in business transactions. In the case of a new employee or an employee in charge having less association with the outside of the company, by inhibiting an e-mail to be transmitted from an individual PC directly to the outside of the company such as public institutions or government offices and by configuring such that an e-mail is transmitted to the outside of the company via the composite machine if the e-mail is transmitted to the outside of the company, the management of the transmission is facilitated because the log of the e-mail transmission is stored in the composite machine even though the e-mail is transmitted by an individual. In such a configuration, by only registering users in a department to the composite machine installed in the department, the management is facilitated for the e-mail transmission log from the department to the outside of the company, and if wrong transmission occurs, a countermeasure can be taken immediately.

An example of the transmission restraint is described with reference to a transmission condition table 71 of FIG. 5 and others. The transmission restraint may be based on a transmission destination 71a and may be performed with an e-mail address 71b thereof. For example, transmission may be enabled for all the e-mail addresses registered as transmission destinations of the business department of the company A, or transmission may be enabled only for a certain e-mail address of the business department of the company A. Contrary, as illustrated as a transmission condition table 72 of FIG. 6, a list for restraining (inhibiting) transmission may be registered with transmission destinations 72a and e-mail addresses 72b in a similar way. Although only the e-mail address is shown as an example of the transmission restraint, a similar transmission enabling list or transmission inhibiting list may be stored for applying to other data transmission modes. In this way, for the transmission destination which needs the management of the transmission log, for example, by transmitting an e-mail via the digital composite machine 1 managed in each department or each group, the log management can be performed easily because the transmission log is stored in the digital composite machine 1 managed in each department or each group, and the transmission restraint can be also imposed. These tables are stored in the HD 37 in a relational database format and the like for each user or all the users of the PC 2, and the tables may be managed by the management portion 39. In this way, by setting the transmission restraint for each user of the PC 2, more detailed transmission restraint can be performed. For example, users may be ranked as a new employee, an assistant manager level, an administrator and the like to set predetermined conditions for each level. The transmission restraint may be performed with other conditions about the transmission destination of the outside transmission data, for example, a domain of an e-mail address.

The transmission restraint may be configured to be performed with predetermined conditions including conditions about the transmission date and time of the outside transmission data. The conditions about the transmission date and time are conditions for each time period and/or based on calendar information and are, for example, conditions indicating a fixed time, other times, working days, holidays and the like. In this way, an attempt to transmit data to the outside can be prevented during a time period when nobody is around, such as nighttime hours or holidays, and security can be improved.

Apart from setting the transmission restraint for each user, conditions about users of the PC 2 may be included as transmission restraint, i.e., predetermined conditions. For example, as illustrated by a transmission condition table 73 of FIG. 7, pieces of information such as e-mail permission information 73b, FAX permission information 73c, FTP permission information 73d and the like are stored for user information 73a such as a user name or ID and a group name. The transmission condition table 73 stores, for example, information such as "a user B cannot be permitted for e-mail transmission and FTP transmission, however, FAX transmission is permitted", and the digital composite machine 1 performs the transmission permission/limitation based on the information.

In addition to receiving the outside transmission data from the PC 2 and transmitting the data to the outside, the digital composite machine 1 is preferably enabled to transmit data from the own machine 1 to the outside in conjunction with similar log accumulation and transmission restraint. In other words, the digital composite machine 1 accepts data transmission from a user to the outside, transmits the accepted data to the outside with limitation, and accumulates the log information. In this way, the similar limitation is preferably applied not only to the outside transmission data, but also to the data transmitted from the digital composite machine 1 itself and, in this case, the user information used for the transmission restraint and log accumulation may be determined by reading an IC card or by identifying a user with an input result of an ID (and a password).

FIG. 8 is a flowchart for describing another example of the outside data transmission processing in the system shown in FIG. 2 and FIG. 3.

Although the transmission restraint described in FIG. 4 is performed only by the digital composite machine 1, the similar transmission restraint may be shared with the PC 2 side. In other words, the limitation of the data transmission to the outside is performed by executing a transfer determination program with the CPU 51 in the PC 2 and by executing a transmission restraint program with the device control portion 34 and the like. Although the sharing may be defined with any assignment, basically, in order not to store the information for the transmission restraint in the PC 2 side, a program is preferably stored in the PC 2 side for reading the information stored in the digital composite machine 1 side. With such a configuration, for example, by following a processing procedure such that the transmission to the digital composite machine 1 is performed by the mail management portion 56 if a specific person is identified and then the transmission is performed from the digital composite machine 1 to the specified destination, not only the log is left in the individual PC 2, but also the management log is left on the digital composite machine 1 side.

As described above, by the system connecting the digital composite machine 1 to the PC 2 via the network 3, data are transmitted to the outside as follows, for example. First, the operation portion 57 of the PC 2 accepts from a user an operation for transmitting data to the outside of the network 3 (step S11). The PC 2 determines the transmission conditions of the transmission destination and the like from the outside transmission data (step S12). In accordance with the determination of step S12, it is determined whether the direct transmission from the PC 2 can be performed or not, and if the direct transmission can be performed, the data are transmitted directly to the external equipment (step S14) and the transmission history is stored in the PC 2 (step S15). On the other hand, if it is determined that the direct transmission cannot be performed in step S13, the outside transmission data are transmitted to the digital composite machine 1 via the network 3 (step S16) and the transmission history is stored in the PC 2 (step S15). After going through step S14, step S15 does not have to be performed.

When receiving the outside transmission data transmitted in step S16, the digital composite machine 1 receives the outside transmission data transferred from the PC 2 via the network 3 with the communication portion 36 and transmits the received outside transmission data to the outside with the communication portion 36 or the FAX modem 35. The digital composite machine 1 accumulates the log information of the outside transmission data transmitted to the outside into the HD 37 in a manner enabling the management portion 39 to perform the log management. On this occasion, the digital composite machine 1 determines whether the received outside transmission data satisfy the transmission conditions (step S17), and if satisfying the transmission conditions, the data are transmitted to the specified external equipment (step S18) and the transmission history (transmission log) is stored (step S19). On the other hand, if the transmission conditions are not satisfied, the data is stored (step S20) and the sending PC 2 (or a PC used by a supervisor of the user of the PC 2) is notified of this (step S21).

Although each embodiment has been described as above with a focus on an image forming apparatus, information processing apparatus, a system and a program of the present invention with reference to FIG. 1 to FIG. 8, as described based on a processing flow in each embodiment mentioned above, the present invention can be employed as a form of a data transmission method and can also be employed as a form of a program or a computer readable recording medium recording the program, as described above.

Descriptions are made for an embodiment of a recording medium recording a program and data for realizing the functions of the data transmission according to the present invention. Specifically, the recording medium can be assumed to be a CD-ROM, a magnetic optical disk, a DVD-ROM, a FD, a flash memory and other various ROMs and RAMs and, by recording the above-described program in those recording media for distribution, the realization of the functions is facilitated. Then, by storing the program into the recording medium provided in the information processing apparatus such as a computer illustrated in FIG. 3 or into the image forming apparatus illustrated in FIG. 2 and by reading out the program as needed, the data transmission function according to the present invention can be performed.

According to the present invention, advantages can be obtained as follows. According to the present invention, when a user transmits data from an information processing apparatus to the outside, log information can be accumulated in an image forming apparatus connected via network to the information processing apparatus.

According to the present invention, when a user transmits data from an information processing apparatus to the outside, log information can be accumulated in an image forming apparatus connected via network to the information processing apparatus and an unnecessary data outflow due to the data transmission can be prevented.

The invention claimed is:

1. An image forming apparatus connectable to an information processing apparatus via a network, comprising:
   a data reception portion receiving outside transmission data transmitted from the information processing apparatus via the network;
   a data transmission portion transmitting the outside transmission data received by the data reception portion to the outside;
   and a log accumulation portion accumulating log information of the outside transmission data transmitted to the outside by the data transmission portion, wherein the data reception portion includes an outside reception portion receiving outside transmission data in a plurality of transmission modes and wherein the data transmission portion includes an outside transmission portion supporting the plurality of the transmission modes and, wherein the outside transmission portion includes at least one of an e-mail transmission portion, a facsimile transmission portion and an FTP-based file transfer portion.

2. The image forming apparatus of claim 1, wherein the log accumulation portion accumulates the log information in a manner enabling to be browsed from the information processing apparatus via the network.

3. The image forming apparatus of claim 1, further comprising a transmission restraint portion permitting only the outside transmission data received by the data reception portion satisfying predetermined conditions to be transmitted by the data transmission portion.

4. The image forming apparatus of claim 3, wherein the predetermined conditions include conditions about a transmission destination and/or transmission date and time of the outside transmission data.

5. The image forming apparatus of claim 3, wherein the predetermined conditions are set for each user of the information processing apparatus.

6. The image forming apparatus of claim 3, wherein the predetermined conditions include conditions about a user of the information processing apparatus.

7. An image forming apparatus connectable to an information processing apparatus via a network, comprising:
   a data reception portion receiving outside transmission data transmitted from the information processing apparatus via the network;
   a data transmission portion transmitting the outside transmission data received by the data reception portion to the outside;
   a log accumulation portion accumulating log information of the outside transmission data transmitted to the outside by the data transmission portion,
   and a transmission restraint portion permitting only the outside transmission data received by the data reception portion satisfying predetermined conditions to be transmitted by the data transmission portion, wherein the transmission restraint portion includes a data transfer portion
   transferring the outside transmission data for the purpose of obtaining permission to the information processing apparatus used by another user associated with a user of the information processing apparatus which is a transmission source of the outside transmission data when data transmission to the outside is restrained.

8. The image forming apparatus of any one of claims 1 to 7, wherein the information processing apparatus is another image forming apparatus different from the image forming apparatus.

9. An information processing apparatus connectable to an image forming apparatus via a network, comprising: a transmission acceptance portion accepting from a user an operation of transmitting data to the outside of the network;
   and a data transfer portion transferring outside transmission data defined as a transmission target by the transmission acceptance portion to the image forming apparatus via the network without transmitting directly to the outside,
   a transfer determination portion determining whether or not outside transmission data defined as a transmission target by the transmission acceptance portion is needed to be transferred to the image forming apparatus by the data transfer portion; and
   a data transmission portion transmitting outside transmission data defined as a transmission target by the transmission acceptance portion directly to the outside, only in case the transfer determination portion determines that the transfer to the image forming apparatus is not needed.

10. The information processing apparatus of claim 9, wherein the information processing apparatus is another image forming apparatus different from the image forming apparatus.

11. A computer-readable medium having recorded thereon a program for causing an image forming apparatus connectable to an information processing apparatus via a network, to drive a central processing unit of the image forming apparatus so as to execute: a data reception step of receiving outside transmission data transmitted from the information processing apparatus via a network; to perform a data transmission step of transmitting the outside transmission data received in the data reception step to the outside;

and to perform a log accumulation step of accumulating log information of the outside transmission data transmitted to the outside in the data transmission step into a storage within the image forming apparatus, wherein the program includes a program operable to drive the central processing unit so as to execute a transmission restraint step of permitting only the outside transmission data received in the data reception step satisfying predetermined conditions to be transmitted in the data transmission step.

12. The computer-readable medium of claim 11, wherein the log accumulation step is a step of accumulating the log information in a manner enabling to be browsed from an information processing apparatus via a network.

13. A computer-readable medium having recorded thereon a program for causing an information processing apparatus connectable to an image forming apparatus via a network, to drive a central processing unit of the information processing apparatus so as to execute: a data transmission acceptance step of accepting from a user an operation of transmitting data to the outside of the network;

and to perform a data transfer step of transferring outside transmission data defined as a transmission target in the data transmission acceptance step to the image forming apparatus via the network without transmitting directly to the outside, wherein the program includes a program operable to drive the central processing unit so as to execute: a transfer determination step of determining whether or not outside transmission data defined as a transmission target in the data transmission acceptance step is needed to be transferred to the image forming apparatus in the data transfer step; and to perform a data transmission step for transmitting outside transmission data defined as a transmission target in the data transmission acceptance step directly to the outside, only in case the transfer determination step determines that the transfer to the image forming apparatus is not needed.

14. A data transmission method for transmitting data in a system connecting an image forming apparatus to an information processing apparatus via a network, comprising: a data transmission acceptance step of the information processing apparatus accepting from a user an operation of transmitting data to the outside of the network; a data transfer step of the information processing apparatus transferring outside transmission data defined as a transmission target in the data transmission acceptance step to the image forming apparatus via the network without transmitting directly to the outside; a data reception step of the image forming apparatus receiving outside transmission data transferred from the information processing apparatus via the network; a data transmission step of the image forming apparatus transmitting the outside transmission data received in the data reception step to the outside; and a log accumulation step of the image forming apparatus accumulating log information of the outside transmission data transmitted to the outside in the data transmission step, a transmission restraint step of the image forming apparatus permitting only the outside transmission data received in the data reception step satisfying predetermined conditions to be transmitted in the data transmission step.

* * * * *